(12) United States Patent
Smith

(10) Patent No.: US 12,385,437 B2
(45) Date of Patent: *Aug. 12, 2025

(54) COMBINED CYCLE POWER PLANTS WITH EXHAUST GAS RECIRCULATION INTERCOOLING

(71) Applicant: GE Infrastructure Technology LLC, Greenville, SC (US)

(72) Inventor: Raub Warfield Smith, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,536

(22) Filed: Nov. 15, 2023

(65) Prior Publication Data

US 2024/0301831 A1 Sep. 12, 2024

Related U.S. Application Data

(63) Continuation of application No. 17/863,011, filed on Jul. 12, 2022, now Pat. No. 11,852,074.

(51) Int. Cl.
*F02C 7/18* (2006.01)
*F01K 23/10* (2006.01)
(Continued)

(52) U.S. Cl.
CPC ............ *F02C 7/185* (2013.01); *F01K 23/101* (2013.01); *F02C 3/34* (2013.01); *F02C 7/143* (2013.01);
(Continued)

(58) Field of Classification Search
CPC .... F02C 3/34; F02C 3/305; F02C 1/08; F02C 9/16; F02C 9/20; F02C 7/185;
(Continued)

(56) References Cited

U.S. PATENT DOCUMENTS 6,256,976 B1 7/2001 Kataoka et al.
6,363,709 B2 4/2002 Kataoka et al.
(Continued)

OTHER PUBLICATIONS

International Search Report and Written Opinion for Patent Application No. PCT/US2023/026456 mailed Jul. 27, 2023; 10 pp.

*Primary Examiner* — Alain Chau
(74) *Attorney, Agent, or Firm* — Armstrong Teasdale LLP

(57) ABSTRACT

A method of operating a combined cycle power plant to facilitate increasing an output of the power plant. The method includes discharging a first exhaust gas stream from a gas turbine engine and extracting heat from the first exhaust gas stream via a heat recovery steam generator. The method also includes discharging a second exhaust gas stream from the heat recovery steam generator, pressurizing a first portion of the second exhaust gas stream using a recirculation compressor, and cooling the first portion of the second exhaust gas stream using a first cooler. The method further includes discharging a cooled exhaust gas stream from the first cooler to the gas turbine engine and modulating, via a controller, a flow and a temperature of the first portion of the second exhaust gas stream recirculated towards the gas turbine engine.

17 Claims, 6 Drawing Sheets

(51) Int. Cl.
*F02C 3/34* (2006.01)
*F02C 7/143* (2006.01)

(52) U.S. Cl.
CPC ...... *F05D 2220/31* (2013.01); *F05D 2220/32* (2013.01); *F05D 2220/62* (2013.01); *F05D 2220/72* (2013.01); *F05D 2260/213* (2013.01)

(58) Field of Classification Search
CPC .... F01K 23/10; F01K 23/101; F23C 2202/00; F23C 2202/30
See application file for complete search history.

(56) References Cited

U.S. PATENT DOCUMENTS

| | | | |
|---|---|---|---|
| 6,598,402 B2 | 7/2003 | Kataoka et al. | |
| 6,817,186 B2* | 11/2004 | Tanaka | F02C 9/28 60/773 |
| 7,274,111 B2* | 9/2007 | Andrew | F01D 15/10 60/773 |
| 7,355,297 B2* | 4/2008 | Andrew | F01K 23/101 290/2 |
| 7,608,938 B2* | 10/2009 | Andrew | H02J 3/38 290/2 |
| 8,046,986 B2* | 11/2011 | Chillar | F01D 25/30 60/773 |
| 8,117,825 B2 | 2/2012 | Griffin et al. | |
| 8,171,718 B2 | 5/2012 | Gulen et al. | |
| 9,217,367 B2 | 12/2015 | Sander et al. | |
| 9,617,914 B2 | 4/2017 | Minto et al. | |
| 9,670,841 B2 | 6/2017 | Mittricker et al. | |
| 9,810,050 B2 | 11/2017 | Sites et al. | |
| 9,869,246 B2 | 1/2018 | Benz et al. | |
| 9,885,290 B2 | 2/2018 | Della-Fera et al. | |
| 10,012,151 B2* | 7/2018 | Thatcher | F02C 9/20 |
| 10,100,728 B2* | 10/2018 | Sander | F02C 3/34 |
| 10,215,059 B2 | 2/2019 | Mohr et al. | |
| 10,273,880 B2* | 4/2019 | Kolvick | F02C 7/141 |
| 10,570,825 B2 | 2/2020 | Huntington et al. | |
| 10,738,711 B2 | 8/2020 | Della-Fera et al. | |
| 10,865,710 B2 | 12/2020 | Wang et al. | |
| 2004/0055272 A1* | 3/2004 | Tanaka | F02C 7/042 60/39.182 |
| 2007/0132249 A1* | 6/2007 | Andrew | F01K 3/00 290/52 |
| 2007/0290507 A1* | 12/2007 | Andrew | F02C 6/18 290/52 |
| 2008/0095294 A1* | 4/2008 | Andrew | F01K 23/101 376/210 |
| 2009/0145126 A1* | 6/2009 | Chillar | F02C 6/16 700/274 |
| 2010/0058758 A1 | 3/2010 | Gilchrist, III et al. | |
| 2011/0079017 A1 | 4/2011 | Can et al. | |
| 2011/0289898 A1 | 12/2011 | Hellat et al. | |
| 2011/0289899 A1* | 12/2011 | De La Cruz Garcia | F02C 3/28 60/39.38 |
| 2011/0302922 A1* | 12/2011 | Li | F02C 3/34 60/645 |
| 2011/0314815 A1* | 12/2011 | Li | F02C 6/18 60/645 |
| 2012/0137698 A1 | 6/2012 | Mats | |
| 2013/0047576 A1 | 2/2013 | Sander et al. | |
| 2014/0000271 A1 | 1/2014 | Mittricker et al. | |
| 2014/0000273 A1 | 1/2014 | Mittricker et al. | |
| 2014/0020388 A1* | 1/2014 | Salazar | F01K 23/10 60/689 |
| 2014/0020398 A1 | 1/2014 | Mittricker et al. | |
| 2014/0116023 A1 | 5/2014 | Anand et al. | |
| 2014/0250908 A1 | 9/2014 | Huntington et al. | |
| 2014/0338901 A1 | 11/2014 | Sites et al. | |
| 2014/0374109 A1* | 12/2014 | Denton | F02C 7/18 166/309 |
| 2015/0000293 A1* | 1/2015 | Thatcher | F02C 3/30 60/39.52 |
| 2015/0059350 A1* | 3/2015 | Kolvick | G05B 15/02 60/39.52 |
| 2015/0377146 A1 | 12/2015 | Della-Fera et al. | |
| 2018/0156136 A1 | 6/2018 | Della-Fera et al. | |
| 2018/0347407 A1 | 12/2018 | Mohr et al. | |

* cited by examiner

COMBINED CYCLE POWER PLANTS WITH EXHAUST GAS RECIRCULATION INTERCOOLING

CROSS REFERENCE TO RELATED APPLICATIONS

This application claims the benefit of priority to U.S. patent application Ser. No. 17/863,011, filed Jul. 12, 2022, and entitled "COMBINED CYCLE POWER PLANTS WITH EXHAUST GAS RECIRCULATION INTERCOOLING", the contents and disclosure of which are hereby incorporated in their entirety.

BACKGROUND

The present disclosure relates generally to power generation systems and, more specifically, to systems that use cooled air or recirculated exhaust gas for compressor intercooling.

Gas turbine systems are used to generate power, and typically include a compressor, a combustor, and a turbine. Operation of the gas turbine system at higher operating temperature generally results in increased performance, efficiency, and power output. As such, during operation various gas path components in the system may be subjected to high temperature flows. Over time, continued exposure to high temperature flows may unduly strain the components and/or reduce their service life. Thus, at least some known gas turbine components that are subjected to high temperature flows are cooled to enable the gas turbine system to continue to operate at the increased temperatures. For example, some components may be provided with compressor bleed air, and the like, for cooling purposes. However, any air compressed in the compressor and not used to generate combustion gases generally reduces the overall efficiency of the gas turbine system.

BRIEF DESCRIPTION

In one aspect, a method of operating a combined cycle power plant to facilitate increasing an output of the power plant is provided. The method includes discharging a first exhaust gas stream from a gas turbine engine and extracting heat from the first exhaust gas stream via a heat recovery steam generator. The method also includes discharging a second exhaust gas stream from the heat recovery steam generator and pressurizing a first portion of the second exhaust gas stream using a recirculation compressor. The method further includes cooling the first portion of the second exhaust gas stream using a first cooler, discharging a cooled exhaust gas stream from the first cooler to the gas turbine engine, and modulating, via a controller, a flow and a temperature of the first portion of the second exhaust gas stream recirculated towards the gas turbine engine.

In another aspect, a method of increasing an output of a gas turbine engine is provided. The gas turbine engine includes a compressor and a turbine. The method includes discharging a first exhaust gas stream from the turbine of the gas turbine engine, pressurizing a portion of the first exhaust gas stream to discharge a pressurized stream using an admission compressor, and cooling the pressurized stream to discharge a cooled stream using a first cooler. The method also includes receiving the cooled stream at the compressor of the gas turbine engine, monitoring, by a controller, a temperature of the pressurized stream discharged from the admission compressor, and modulating, via the controller, a flow and a temperature of the cooled stream received by the compressor of the gas turbine engine to facilitate maintaining the temperature of the pressurized stream discharged from the admission compressor within a predefined temperature range.

In a further aspect, a method of operating a combined cycle power plant to facilitate increasing an output of the power plant is provided. The method includes discharging a first exhaust gas stream from a gas turbine engine, extracting heat from the first exhaust gas stream via a heat recovery steam generator, and pressurizing an airflow stream channeled towards a compressor of the gas turbine engine using an admission compressor. The method also includes cooling at least one of the airflow stream and the second exhaust gas stream using a first cooler, discharging a cooled exhaust gas stream by the first cooler to the gas turbine engine, and modulating, via a controller, a flow and a temperature of the second exhaust gas stream recirculated towards the gas turbine engine.

DETAILED DESCRIPTION

The embodiments described herein relate to power generation systems that use injected cooled air or recirculated exhaust gases for compressor intercooling. While exhaust gas recirculation is traditionally provided to the inlet of a gas turbine, the systems described herein compress the recirculated exhaust gases to enable it to be channeled into an interstage compressor admission after the gases have been cooled. This effectively turns a simple Brayton cycle engine into an intercooled one. Alternatively, boosted and cooled ambient air may be provided to the compressor interstage admission.

Benefits of derived compressor interstage admission of cooled ambient air or recirculated exhaust gas admission to a gas turbine include: a) power augmentation from the reduction in working fluid temperature from the admission of the cooled stream, as well as a reduction in compressor exit temperature, the combination of which enables more fuel to be burned; b) a reduction in the physical size of exhaust recirculation piping/duct-work versus recirculation to the compressor inlet, thus reducing costs and facilitating an ease of exhaust line routing; c) a reduced gas temperature within, and at the discharge of, the compressor, thereby reducing rotor temperatures and extending a useful life of gas turbine rotor and hot gas path components; and d) usefulness in conventional gas turbine combined cycle systems without exhaust gas recirculation by channeling aftercooled ambient air rather than exhaust gases into the boost compressor, particularly useful for any engine with compressor discharge limits and/or any turbines operating in environments where hot day output is valuable.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
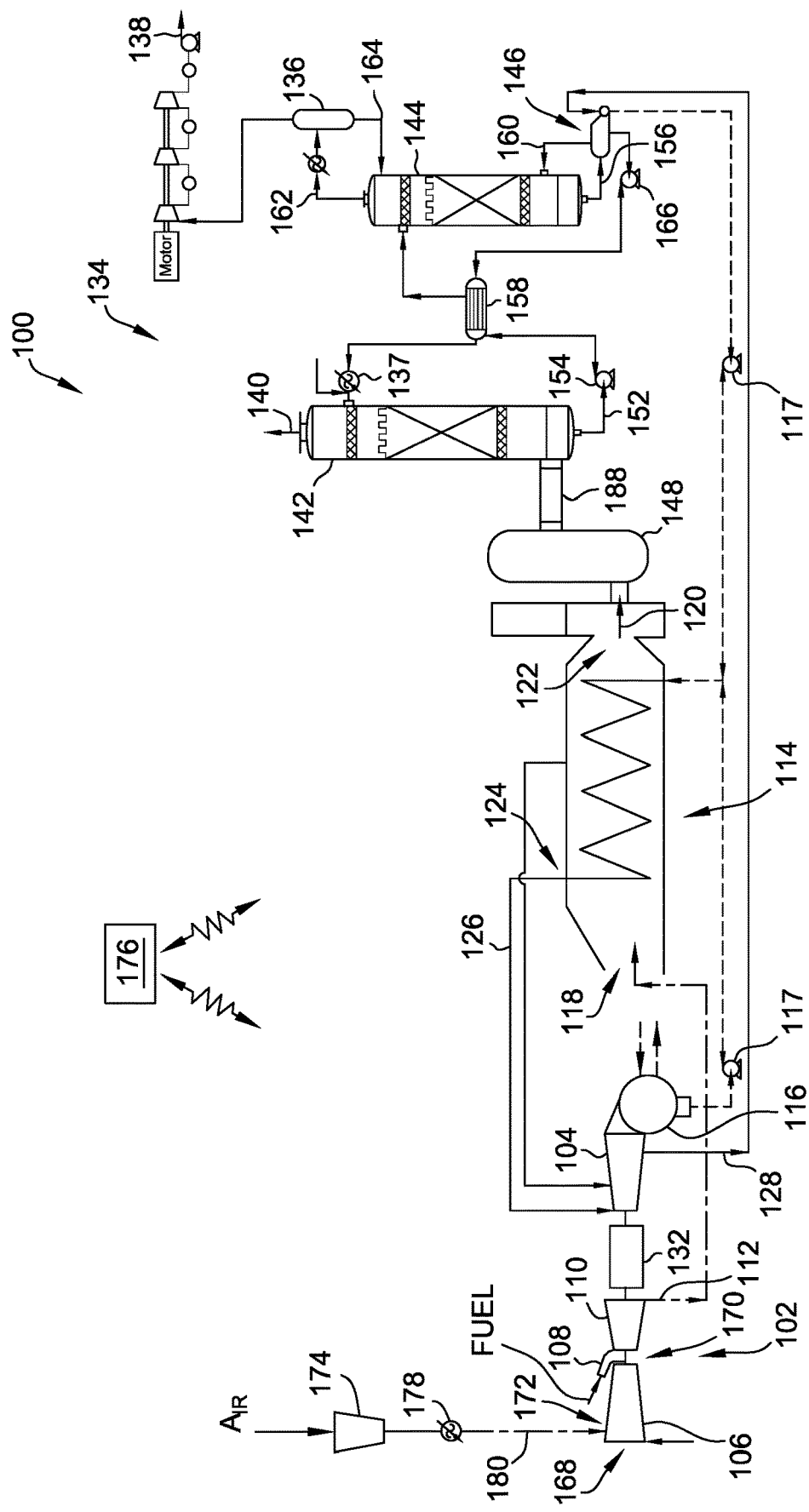
FIG. 1 is a schematic illustration of an exemplary combined cycle power plant including an exemplary gas turbine assembly.

FIG. 1 is a schematic illustration of an exemplary combined cycle power plant 100. In the exemplary embodiment, power plant 100 includes a gas turbine assembly 102 and a steam turbine 104. Gas turbine assembly 102 includes a compressor 106, a combustor 108, and a turbine 110 coupled together in a serial flow relationship. In operation, combustor 108 receives air from compressor section 106 and fuel from a fuel supply and mixes the fuel and air to create a fuel-air mixture that is combusted to generate combustion gases. Combustion gases are channeled through turbine 110 and discharged from turbine 110 as a first exhaust gas stream 112. In the exemplary embodiment, power plant 100 also includes a steam cycle arrangement including a heat recovery steam generator (HRSG) 114 and steam turbine 104. In some embodiments, the steam cycle arrangement may also include other components, including a condenser 116 and at least one circulation pump 117. Moreover, in other embodiments, the steam cycle arrangement may also include at least one additional HRSG 114.

In the exemplary embodiment, HRSG 114 includes an inlet 118 that receives first exhaust gas stream 112 from gas turbine assembly 102. Heat is extracted from first exhaust gas stream 112, and a second exhaust gas stream 120 is discharged from a first outlet 122. Second exhaust gas stream 120 is at a lower temperature than a temperature of first exhaust gas stream 112 entering inlet 118. HRSG 114 also includes a second outlet 124 that discharges a first steam stream 126. Steam turbine 104 receives first steam stream 126 and subsequently discharges an interstage extraction flow 128 therefrom. Any steam not extracted with flow 128 continues expansion to condensation within condenser 116. In some embodiments, steam turbine 104 may include additional steam admissions from HRSG 114. In the exemplary embodiment, gas turbine assembly 102 and steam turbine 104 are both coupled to a generator 132 that produces power using working fluids flowing through each. Alternatively, turbine assembly 102 and steam turbine 104 may be on separate shafts, with each coupled to a separate generator.

In the exemplary embodiment, power plant 100 also includes a carbon capture system 134. During operation, carbon capture system 134 produces a carbon dioxide stream 138. Carbon capture system 134 may include one or more separators, either used alone, or in combination with other separation processes, such as carbon dioxide selective membrane technologies, absorption processes, diaphragms, and the like. An exhaust stream or carbon depleted exhaust stream 140 may be discharged from carbon capture system 134 to the ambient environment. Exhaust stream 140 may also be further processed prior to discharge to the environment or elsewhere. At least a portion of carbon dioxide stream 138 may be increased to supercritical pressure for transport and/or storage, for example.

Carbon capture system 134 generally includes an absorber 142, a stripper 144, and a stripper reboiler 146. In operation, second exhaust gas stream 120 discharged from HRSG 114 is channeled towards absorber 142. The exhaust gas may be pretreated for removal of particulates and impurities such as SOx and NOx before entry into absorber 142. In addition, in the exemplary embodiment, a first cooler 148 is coupled between HRSG 114 and carbon capture system 134. Alternatively, carbon capture system 134 may include at least one booster blower (not shown) to pressurize flow channeled towards carbon capture system 134. First cooler 148 may be, but is not limited to only being, a quench tower. First cooler 148 cools a portion of second exhaust gas stream 120 to be channeled towards carbon capture system 134. A solvent 152, rich in carbon dioxide, is discharged from absorber 142 and is then channeled, via a pump 154, to stripper 144. A solvent 156, lean in carbon dioxide, is discharged from stripper 144 and is channeled back to an upper portion of absorber 142 via reboiler 146, a pump 166, and heat exchanger 158. Absorber 142 may be of any construction typical for providing gas-liquid contact and absorption. Absorber 142 and stripper 144 may incorporate a variety of internal components, such as trays, packings, and/or supports, for example. In one embodiment, absorber 142 absorbs carbon dioxide via a countercurrent flow from the entering exhaust gas. Stripper 144 removes carbon dioxide from solvent 152. Absorber 142 and stripper 144 may be variably sized based on an amount of carbon dioxide to be removed, and may be sized according to various engineering design equations. Furthermore, a single stripper 144 may serve and be coupled to multiple absorbers 142.

The solvent may be a solution or dispersion, typically in water, of one or more absorbent compounds. More specifically, the solvent may be any compound which when mixed with water creates an absorbent fluid that, as compared to water alone, increases the ability of the fluid to preferentially remove carbon dioxide from exhaust gas. For example, the solvent may be, but is not limited to only being, monethanolamine (MEA). Inhibitors may be included in the solvent to inhibit degradation of the solvent.

In the exemplary embodiment, solvent 152 is preheated in a countercurrent heat exchanger 158 against solvent 156, and is subsequently channeled to stripper 144. Stripper 144 is a pressurized unit in which carbon dioxide is recovered from solvent 152. Stripper 144 generally incorporates reboiler 146 which receives a portion of solvent 156 exiting stripper 144. Reboiler 146 vaporizes solvent 156 and channels solvent vapor 160 back to stripper 144 to facilitate increased carbon dioxide separation. A single stripper may be coupled to more than one reboiler 146. Reboiler 146 receives steam, such as from steam turbine 104 via stream 128 to provide heating duty in reboiler 146.

Vapor 162 exiting stripper 144 is partially condensed in a condenser 136. The condensed portion of vapor 162 is returned to stripper 144 as reflux 164. Reflux 164 may be transferred through an accumulator (not shown) and a pump (not shown) before entry into stripper 144. Carbon dioxide stream 138 is removed from condenser 136 for transport and/or storage after compression.

In the exemplary embodiment, compressor 106 includes an inlet 168, an outlet 170, and an interstage inlet 172 defined therebetween. Power plant 100 includes an admission compressor 174 and a controller 176. Depending on its use in plant 100, admission compressor 174 may be configured for use as a recirculation compressor. In the exemplary embodiment, a cooler 178, also known as an aftercooler, is coupled between admission compressor 174 and interstage inlet 172. Cooler 178 cools the pressurized air discharged from compressor 174 to define a cooled admission stream 180. More specifically, cooler 178 discharges cooled stream 180 towards interstage inlet 172 to facilitate improving the performance of plant 100, as described herein.

However, power consumption from the operation of any booster blowers and/or compressor 174 will reduce plant output. The interstage cooling provided to compressor 106 by compressor 174 and its aftercooler 178, facilitates improving the output of power plant 100 by reducing compression work in compressor 106 and by enabling more fuel to be combusted in combustor 108.

For example, controller 176 may monitor the power consumption of any booster blower and/or compressor 174, (and any large auxiliaries in a particular plant) and may also determine steam cycle losses resulting from discharging steam stream 128 towards carbon capture system 134, for example. Controller 176 may also dynamically determine the power consumption and steam cycle losses, and adjust operation of power plant 100 accordingly. Accordingly, in one embodiment, operation of any booster blower, and/or compressor 174 (and/or any other large auxiliary loads) is adjusted by controller 176 to facilitate improving plant output to a level that overcomes power consumption and steam cycle losses. That is, controller 176 may selectively modulate the flow of any stream channeled into compressor 106 as described herein, to provide an improvement to the output of power plant. In one exemplary embodiment, plant output boost should be increased by at least about 5% to about 10% using the cooled injection versus the providing about the same exhaust gas flow recirculation to the gas turbine inlet. Moreover, because the temperature of compressor exhaust discharge can be more easily controlled, bigger performance gains are possible on hot days where the temperature of compressor exhaust discharge can typically be limiting in at least some known power generation systems.

One exemplary gas turbine parameter that may be monitored to determine improvements in gas turbine output is compressor discharge temperature. In the exemplary embodiment, power plant 100 includes a sensor (not shown) coupled at outlet 170 for use in monitoring the temperature of the compressed gas discharged therefrom. Controller 176 may then modulate cooled stream 180 provided to interstage inlet 172 to maintain the compressor discharge temperature within a predefined temperature range. Controller 176 facilitates extending the useful life of components within power plant 100. Thus, the flow modulation provides an option for operators of power plant 100 to use when determining how to optimize performance of power plant 100.

It should be noted that gas turbine assembly 102 may be used independently of HRSG 114 and carbon capture system 134. In other words, turbine assembly 102 may be operated as a simple gas turbine assembly 102 that uses cooled interstage air admission provided via admission compressor 174 and cooler 178. More specifically, in the exemplary embodiment, when turbine assembly 102 is used as a stand-alone, simple cycle gas turbine, assembly 102 operates with cooled interstage air admission, and without inlet boost (shown on FIG. 2 and FIG. 3).

The operation of gas turbine assembly 102 as a simple gas turbine facilitates eliminating a need for higher-cost rotor alloys or additional cooling air, and rather enables the use of steel compressor wheels, especially in operating conditions, such as hot days, where compressor exit air temperatures tend to be highest. In addition, the physical size and cost of cooler 178 is relatively modest in comparison to known power plant systems used to chill air flow to gas turbine inlets because the airflow is lower and the operating temperature of flow entering cooler 178 is higher in relation to the heat sink (ambient). Moreover, admission air facilitates power augmentation because the admission air facilitates reducing work required of compressor 106 while still reducing compressor exhaust discharge temperature.

Figure 2:
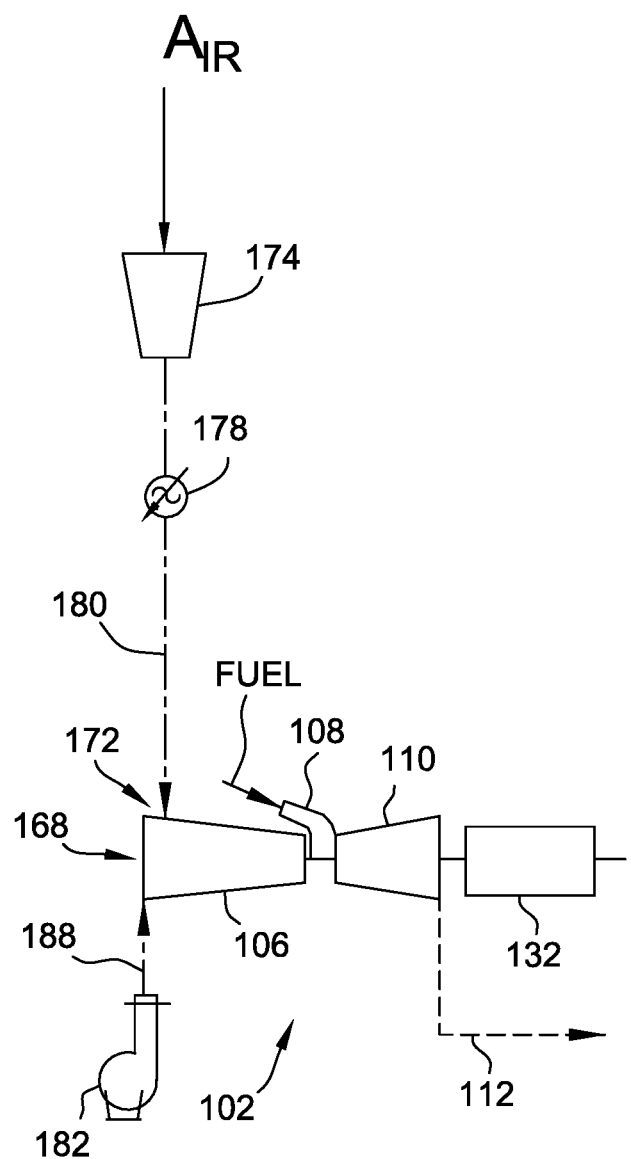
FIG. 2 is a schematic illustration of an alternative gas turbine assembly that may be used with the combined cycle power plant shown in FIG. 1.

FIG. 2 is a schematic illustration of an alternative gas turbine assembly 102 that may be used with combined cycle power plant 100 (shown in FIG. 1.) Unlike the embodiment of FIG. 1, which illustrates an un-boosted gas turbine assembly 102, in FIG. 2, in the exemplary embodiment of FIG. 2, gas turbine assembly 102 utilizes an external inlet boost blower 182. More specifically, in the exemplary embodiment, external air boost blower 182 pressurizes an airflow stream 188 channeled into inlet 168 of compressor 106. Boost blower 182 can be used to supercharge gas turbine assembly 102 such that enhanced or improved gas turbine output is facilitated. In addition, the combination of boost blower 182 and cooled admission stream 180 suppled to compressor 106 enables controller 176 (shown in FIG. 1) to provide enhanced control of the discharge temperature of compressor 106, thus increasing power augmentation potential from turbine assembly 102.

Figure 3:
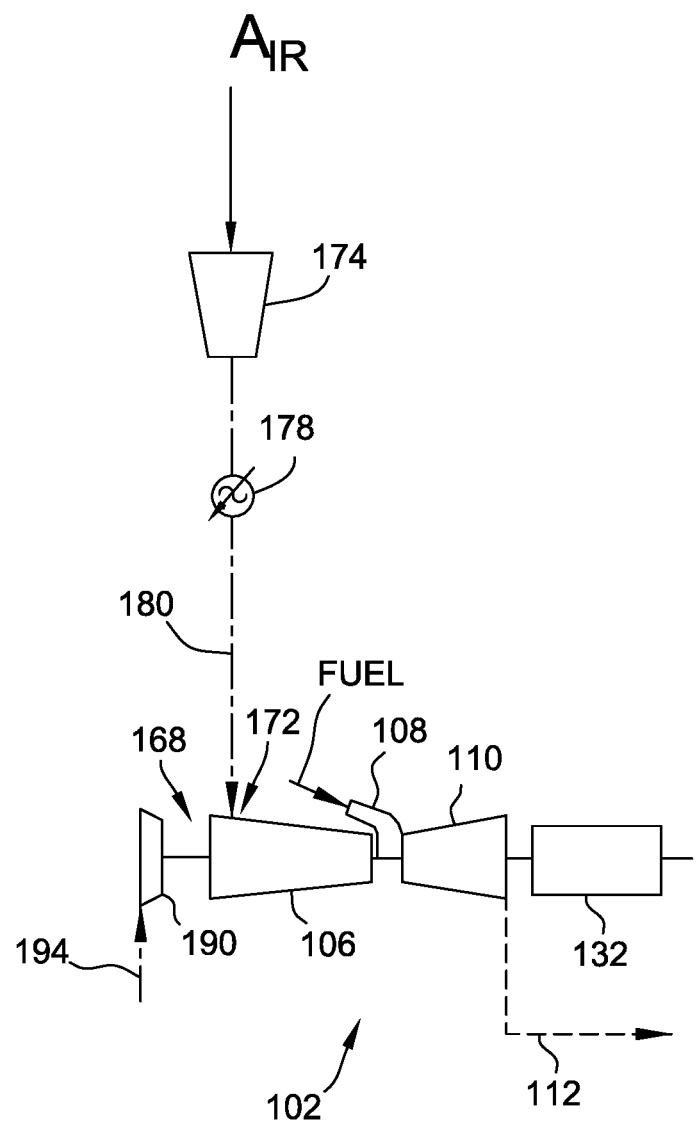
FIG. 3 is a schematic illustration of another alternative gas turbine assembly that may be used with the combined cycle power plant shown in FIG. 1.

FIG. 3 is a schematic illustration of a another alternative gas turbine assembly 102 that may be used with combined cycle power plant 100 (shown in FIG. 1). Unlike the embodiment of FIG. 1, which illustrates an un-boosted gas turbine assembly 102, and the embodiment in FIG. 2, which illustrates an external boost blower, in the exemplary embodiment of FIG. 3, gas turbine assembly utilizes a shaft-driven boost compressor 190. More specifically, in the exemplary embodiment, turbine assembly includes a shaft-driven, inlet boost compressor 190 that pressurizes an ambient airflow stream 194 channeled towards interstage inlet 172 of compressor 106. Similar to boost blower 182 (shown in FIG. 2), compressor 190 may be used to supercharge gas turbine assembly 102. However, compressor 190 is capable of providing an increased supercharged flow to gas turbine assembly 102 as compared to boost blower 182. The increased supercharge facilitates enhancing the gas turbine output over even that of boost blower 182. The combination of compressor 190 and cooled admission stream 180 suppled to compressor 106 enables controller 176 (shown in FIG. 1) to provide enhanced control of the discharge temperature of compressor 106, thus increasing power augmentation potential from turbine assembly 102.

It should be noted that any of the gas turbine assemblies shown in FIGS. 1-3 may be used with or without carbon capture system 134. Moreover, in some embodiments, any of the gas turbine assemblies 102 described herein may be used with recirculated exhaust gas admission, i.e., compressed aftercooled exhaust flow, rather than compressed aftercooled admission stream 180. In such embodiments, the recirculated exhaust gas may be routed from downstream or upstream of first cooler.

Figure 4:
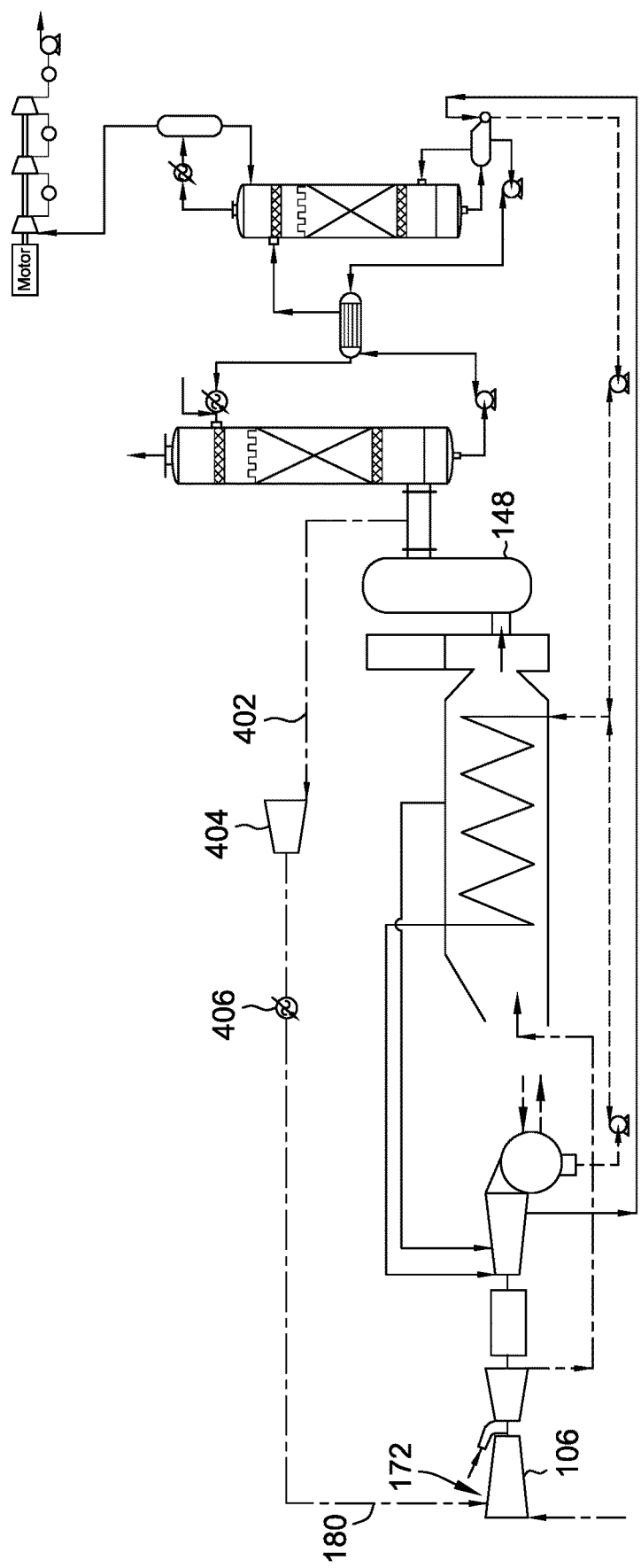
FIG. 4 is a schematic illustration of an alternative combined cycle power plant including a gas turbine assembly.

FIG. 4 is a schematic illustration of an alternative combined cycle power plant 100 (shown in FIG. 1) including gas turbine assembly 102. The embodiment illustrated in FIG. 4 is similar to the embodiment illustrated in FIG. 1, with the differences noted herein, below, and as such, the same reference numbers are used in FIG. 4 as were used in FIG. 1. In FIG. 4, plant 100 utilizes exhaust gas recirculation 402 with post combustion carbon capture system 134. An exhaust gas recirculation stream 402 is drawn downstream from first cooler 148 and is channeled towards an exhaust gas recirculation compressor 404.

A cooler 406 is coupled between recirculation compressor 404 and interstage inlet 172. Cooler 406 cools the pressurized air discharged from compressor 404 to define a cooled admission stream 180. More specifically, cooler 406 discharges cooled stream 180 towards interstage inlet 172 to facilitate improving the performance of plant 100, as described herein. In the exemplary embodiment, because stream 402 is drawn from downstream from cooler 148, the exhaust stream has been scrubbed and cooled and as such compression power for the recirculation compressor 404 is facilitated to be reduced, as well as after cooling needed to facilitate control of compressor discharge temperature.

In the exemplary embodiment, wherein compressed aftercooled air is suppled to interstage inlet 172, the pressurized air stream 180 is clean and as such, cooler 406 and admission compressor 404 may be physically located relatively close to cooler 148 such that piping diameter for steam 180 and plant costs are facilitated to be reduced. In embodiments wherein an existing plant is retrofitted, compressor 106 may be configured to use exhaust gas discharged from compressor 404. In such embodiments, assembly 102 not only gains the benefits described above, but also gains those performance benefits typically associated with exhaust gas recirculation including, but not limited to, vitiated combustion, higher exhaust carbon dioxide emissions, and lower nitrous oxide emissions, for example. Moreover, in the exemplary embodiment, the combination of the operation and pressurization of gas turbine assembly 102 and HRSG system 114 facilitates overcoming the draft losses through the cooler, i.e., quench tower 148, and carbon capture system 134. In other alternative embodiments, a booster fan may be used within carbon capture system 134 depending on equipment and plant design constraints, and economic considerations.

Figure 5:
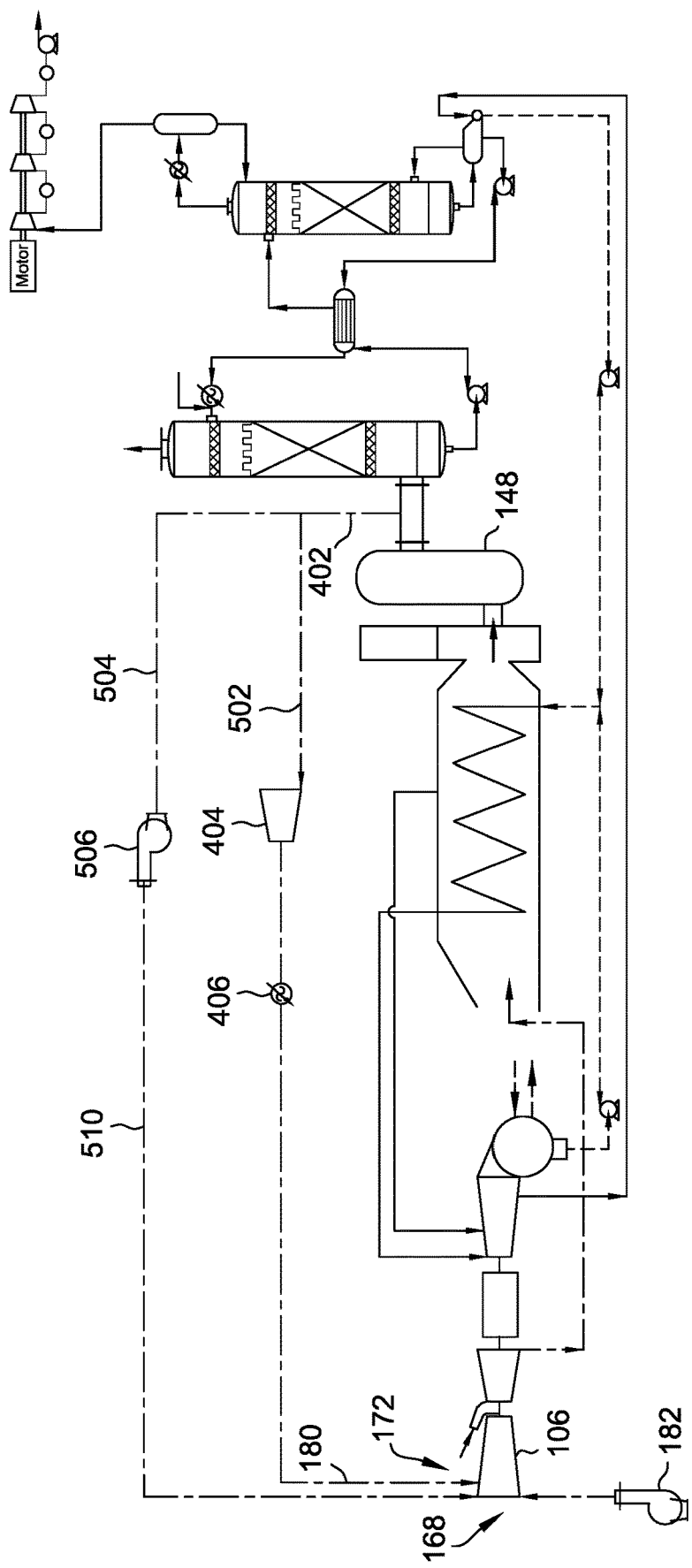
FIG. 5 is a schematic illustration of another alternative combined cycle power plant including a gas turbine assembly.
Figure 6:
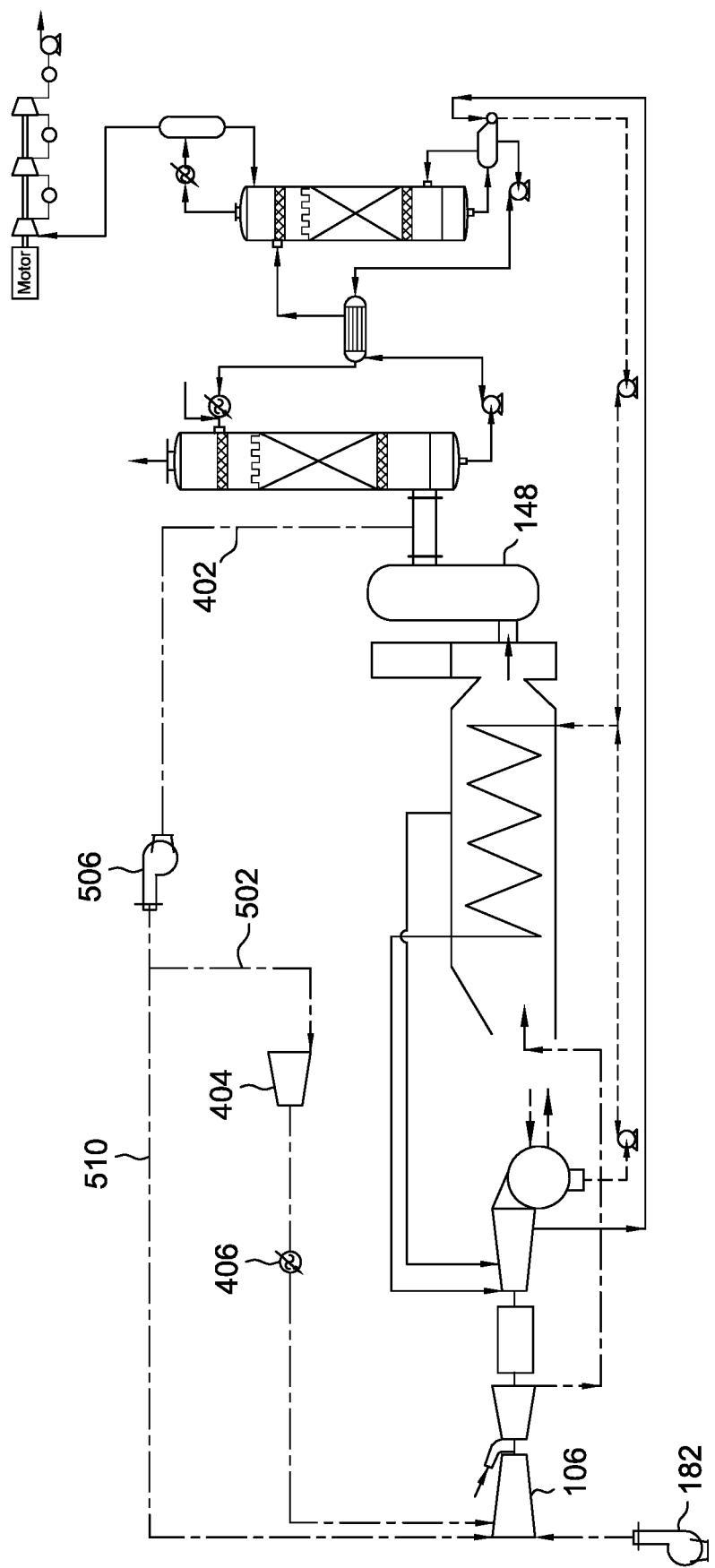
FIG. 6 is a schematic illustration of a further alternative combined cycle power plant including a gas turbine assembly.

FIG. 5 is a schematic illustration of another alternative combined cycle power plant 100 including a gas turbine assembly 102. FIG. 6 is a schematic illustration of yet a further alternative combined cycle power plant 100 including a gas turbine assembly 102. Each alternative embodiment is similar to the embodiment illustrated in FIG. 1, with the differences noted below, and as such, the same reference numbers are used in FIGS. 5 and 6 as were used in FIG. 1.

In FIG. 5, plant 100 utilizes exhaust gas recirculation 402 with post carbon capture system 134. Moreover, in the exemplary embodiment illustrated in FIG. 5, generally plant 100 uses an aftercooled compressed exhaust gas recirculation admission channeled to the main gas turbine, combined with exhaust gas recirculation to the gas turbine inlet. More specifically, an exhaust gas recirculation stream 402 is drawn downstream from first cooler 148 and a portion 502 is channeled towards an exhaust gas recirculation compressor 404. A cooler 406 is coupled between recirculation compressor 404 and interstage inlet 172. Cooler 406 cools the pressurized air discharged from compressor 404 to define a cooled admission stream 180. More specifically, cooler 406 discharges cooled stream 180 towards interstage inlet 172 to facilitate improving the performance of plant 100, as described herein.

The remaining portion 504 of exhaust gas recirculation stream 402 drawn downstream from cooler 148 is channeled towards an exhaust gas boost blower 506. Boost blower 506 discharges a pressurized and cooled flow 510 towards compressor inlet 168. In the exemplary embodiment, because stream 402 is drawn from downstream from cooler 148, the exhaust stream has been scrubbed and cooled. The combination of exhaust gas recirculation compressor 404 and exhaust gas blower 506 facilitates maximizing the total exhaust gas recirculation flow with the use of existing gas turbines within plant 100. More specifically, in the exemplary embodiment of FIG. 5, because the exhaust gas boost blower 506 is combined or paired with the inlet air boost blower 182, gas turbine compressor 106 can operate with an inlet pressure that is greater than ambient or atmospheric pressure such that plant power output is facilitated to be optimized.

Moreover, the embodiment shown in FIG. 5 also enables any losses associated with stream extraction to the carbon capture system 134 to be overcome. More specifically, within the plant embodiment illustrated in FIG. 5, plant 100 is sufficiently pressurized such that any plant output losses associated with operating the carbon capture system 134 are overcome.

The embodiment illustrated in FIG. 6 is similar to the embodiment illustrated in FIG. 5, however the exhaust gas recirculation compressor draws exhaust gas recirculation 502 from downstream of exhaust gas boost blower 506 rather than before stream 402 enters blower 506 as is shown in FIG. 5. Such an embodiment may facilitate simplifying exhaust gas recirculation flow control and thus facilitate reducing overall plant costs since compressor 404 and its associated piping may be located physically closer to turbine assembly 102.

The embodiments described herein relate to providing cooled ambient air or recirculated exhaust gas admission to a gas turbine compressor admission. Conventional exhaust gas recirculation heats the gas turbine inlet, thus reducing the density of working fluid flow entering the compressor and thus, gas turbine and plant output. Compressor exit temperature can also be limited and/or controlled using the cooled interstage admission and control scheme described herein. Accordingly, the embodiments described herein facilitate power augmentation, a reduction in the physical size of exhaust recirculation piping/duct, and a reduced gas temperature within, and at the discharge of, the compressor.

Further aspects of the present disclosure are provided by the subject matter of the following clauses:

A method of operating a combined cycle power plant to facilitate increasing an output of the power plant, the method comprising: discharging a first exhaust gas stream from a gas turbine engine; extracting heat from the first exhaust gas stream via a heat recovery steam generator; discharging a second exhaust gas stream from the heat recovery steam generator; pressurizing a first portion of the second exhaust gas stream using a recirculation compressor; cooling the first portion of the second exhaust gas stream using a first cooler; discharging a cooled exhaust gas stream from the first cooler to the gas turbine engine; and modulating, via a controller, a flow and a temperature of the first portion of the second exhaust gas stream recirculated towards the gas turbine engine.

The method in accordance with any of the preceding clauses, further comprising: discharging a steam stream from a steam turbine; receiving the steam stream at a carbon capture system; monitoring, by the controller, power consumption of the recirculation compressor; and modulating, via the controller, a flow of the steam stream to the carbon capture system based on power consumption of the recirculation compressor.

The method in accordance with any of the preceding clauses, wherein the first exhaust gas stream discharged from the gas turbine engine is a stream discharged from a compressor within the gas turbine engine.

The method in accordance with any of the preceding clauses, further comprising: monitoring, by the controller, a temperature of the compressor discharge stream; and modulating, via the controller, a flow of the cooled exhaust gas stream to the gas turbine engine to facilitate maintaining the temperature of the compressor discharge stream within a predefined temperature range.

The method in accordance with any of the preceding clauses, wherein discharging the cooled exhaust gas stream from the first cooler comprises discharging the cooled exhaust gas stream to an interstage inlet of a compressor of the gas turbine engine.

The method in accordance with any of the preceding clauses, further comprising receiving a second portion of the second exhaust gas stream via an exhaust gas recirculation line.

The method in accordance with any of the preceding clauses, further comprising receiving, via a splitter, the second exhaust gas stream, wherein the splitter separates the second exhaust gas stream into the first portion, the second portion, and a third portion, and wherein the splitter is sized to define the first portion to be between about 5% to about 10% of the second exhaust gas stream, the second portion to be less than about 40% of the second exhaust gas stream, and the third portion to be a remainder by mass of the second exhaust gas stream.

The method in accordance with any of the preceding clauses, further comprising receiving the third portion of the second exhaust gas stream at a carbon capture system.

The method in accordance with any of the preceding clauses, further comprising cooling the third portion of the second exhaust gas stream channeled towards the carbon capture system using a second cooler between the heat recover steam generator and the carbon capture system.

The method in accordance with any of the preceding clauses, further comprising receiving, by an exhaust gas boost blower, the second exhaust gas stream to be channeled towards the recirculation compressor.

A method of increasing an output of a gas turbine engine, the gas turbine engine comprising a compressor and a turbine, the method comprising: discharging a first exhaust gas stream from the turbine of the gas turbine engine; pressurizing a portion of the first exhaust gas stream to discharge a pressurized stream using an admission compressor; cooling the pressurized stream to discharge a cooled stream using a first cooler; receiving the cooled stream at the compressor of the gas turbine engine; monitoring, by a controller, a temperature of the pressurized stream discharged from the admission compressor; and modulating, via the controller, a flow and a temperature of the cooled stream received by the compressor of the gas turbine engine to facilitate maintaining the temperature of the pressurized stream discharged from the admission compressor within a predefined temperature range.

The method in accordance with any of the preceding clauses, further comprising pressurizing an airflow stream prior to the airflow stream being received by the turbine of the gas turbine engine and discharged as the first exhaust gas stream using an external inlet boost blower.

The method in accordance with any of the preceding clauses, further comprising pressurizing an airflow stream prior to the airflow stream being received by the turbine of the gas turbine engine and discharged as the first exhaust gas stream using an inlet boost compressor rotatably coupled to the compressor of the gas turbine engine.

The method in accordance with any of the preceding clauses, further comprising monitoring, by the controller, a temperature of a compressor discharge stream discharged from the compressor of the gas turbine engine.

The method in accordance with any of the preceding clauses, further comprising supercharging the gas turbine engine using an external inlet boost blower.

The method in accordance with any of the preceding clauses, further comprising supercharging the gas turbine engine using a shaft-driven inlet boost compressor.

A method of operating a combined cycle power plant to facilitate increasing an output of the power plant, the method comprising: discharging a first exhaust gas stream from a gas turbine engine; extracting heat from the first exhaust gas stream via a heat recovery steam generator; discharging a second exhaust gas stream from the heat recovery steam generator; pressurizing an airflow stream channeled towards a compressor of the gas turbine engine using an admission compressor; cooling at least one of the airflow stream and the second exhaust gas stream using a first cooler; discharging a cooled exhaust gas stream by the first cooler to the gas turbine engine; and modulating, via a controller, a flow and a temperature of the second exhaust gas stream recirculated towards the gas turbine engine.

The method in accordance with any of the preceding clauses, wherein discharging the cooled exhaust gas stream to the gas turbine engine by the first cooler comprises discharging the cooled exhaust gas stream to an interstage inlet of a compressor of the gas turbine engine.

The method in accordance with any of the preceding clauses, further comprising: discharging a steam stream from a steam turbine; receiving the steam stream at a carbon capture system; monitoring, by the controller, power consumption of the admission compressor; and modulating, via the controller, a flow of the steam stream to the carbon capture system based on power consumption of the admission compressor.

The method in accordance with any of the preceding clauses, further comprising: discharging a compressor discharge stream from a compressor of the gas turbine engine; monitoring, by the controller, a temperature of the compressor discharge stream; and modulating, via the controller, at least one of a flow of the cooled exhaust gas stream and a temperature of the cooled exhaust gas stream to facilitate maintaining the temperature of the compressor discharge stream within a predefined temperature range.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims. The systems and methods described herein are not limited to the specific embodiments described herein, but rather components of the various systems may be utilized independently and separately from other systems and components described herein. For example, the cooled interstage admission can be implemented and utilized in connection with any application where enhanced output is desired.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A method of operating a combined cycle power plant to facilitate increasing an output of the power plant, the method comprising:
    discharging a first exhaust gas stream from a gas turbine engine, the gas turbine engine including a compressor;
    extracting heat from the first exhaust gas stream via a heat recovery steam generator;
    discharging a second exhaust gas stream from the heat recovery steam generator;
    pressurizing a first portion of the second exhaust gas stream using a recirculation compressor;
    cooling the first portion of the second exhaust gas stream using a first cooler;
    discharging a cooled exhaust gas stream from the first cooler to the gas turbine engine;
    discharging a steam stream from a steam turbine;
    modulating, via a controller, a flow and a temperature of the first portion of the second exhaust gas stream recirculated towards an interstage inlet of the compressor for the gas turbine engine to facilitate increasing the output of the power plant;
    monitoring, by the controller, power consumption within at least a portion of the combined cycle power plant; and
    modulating, via the controller, a flow of the steam stream discharged from the steam turbine based on the monitored power consumption.

2. The method in accordance with claim 1, further comprising:
    receiving the steam stream at a carbon capture system; and
    modulating, via the controller, the flow of the steam stream to the carbon capture system based on power consumption of the recirculation compressor.

3. The method in accordance with claim 1, wherein the first exhaust gas stream discharged from the gas turbine engine is formed at least partially from a compressor discharge stream discharged from a compressor of the gas turbine engine.

4. The method in accordance with claim 3, further comprising:
    monitoring, by the controller, a temperature of the compressor discharge stream; and
    modulating, via the controller, a flow of the cooled exhaust gas stream to the gas turbine engine to facilitate maintaining the temperature of the compressor discharge stream within a predefined temperature range.

5. The method in accordance with claim 1, wherein discharging the cooled exhaust gas stream from the first cooler comprises discharging the cooled exhaust gas stream to the interstage inlet of the compressor of the gas turbine engine.

6. The method in accordance with claim 1, further comprising receiving a second portion of the second exhaust gas stream via an exhaust gas recirculation line.

7. The method in accordance with claim 6, further comprising receiving, via a splitter, the second exhaust gas stream, wherein the splitter separates the second exhaust gas stream into the first portion, the second portion, and a third portion, and wherein the splitter is sized to define the first portion to be between about 5% to about 10% of the second exhaust gas stream, the second portion to be less than about 40% of the second exhaust gas stream, and the third portion to be a remainder by mass of the second exhaust gas stream.

8. The method in accordance with claim 7, further comprising receiving the third portion of the second exhaust gas stream at a carbon capture system.

9. The method in accordance with claim 8, further comprising cooling the third portion of the second exhaust gas stream channeled towards the carbon capture system using a second cooler between the heat recover steam generator and the carbon capture system.

10. The method in accordance with claim 1, further comprising receiving, by an exhaust gas boost blower, the second exhaust gas stream to be channeled towards the recirculation compressor.

11. A method of increasing an output of a gas turbine engine, the gas turbine engine including a compressor and a turbine, the method comprising:
    coupling an external inlet boost blower to the gas turbine engine to pressurize an airflow stream received by the turbine;
    discharging a first exhaust gas stream from the turbine of the gas turbine engine;
    pressurizing a portion of the first exhaust gas stream to discharge a pressurized stream using an admission compressor;
    cooling the pressurized stream to discharge a cooled stream using a first cooler;
    receiving the cooled stream at the compressor of the gas turbine engine;
    monitoring, by a controller, a temperature of the pressurized stream discharged from the admission compressor; and
    modulating, via the controller, a flow and a temperature of the cooled stream provided to an interstage inlet of the compressor of the gas turbine engine using the admission compressor and the first cooler, and based on operating parameters monitored by the controller, to facilitate maintaining the temperature of the pressurized stream discharged from the admission compressor within a predefined temperature range and increasing the output of the gas turbine engine.

12. The method in accordance with claim 11, further comprising monitoring, by the controller, a temperature of a compressor discharge stream discharged from the compressor of the gas turbine engine.

13. The method in accordance with claim 11, further comprising supercharging the gas turbine engine using the external inlet boost blower.

14. The method in accordance with claim 11, further comprising supercharging the gas turbine engine using a shaft-driven inlet boost compressor.

15. The method in accordance with claim 14, wherein discharging a stream cooled by the first cooler comprises discharging the cooled stream to an interstage inlet of a compressor of the gas turbine engine.

16. A method of operating a combined cycle power plant to facilitate increasing an output of the power plant, the method comprising:
- discharging a first exhaust gas stream from a gas turbine engine;
- extracting heat from the first exhaust gas stream via a heat recovery steam generator;
- discharging a second exhaust gas stream from the heat recovery steam generator;
- pressurizing an airflow stream channeled towards a compressor of the gas turbine engine using an admission compressor;
- cooling at least one of the airflow stream and the second exhaust gas stream using a first cooler;
- discharging a stream cooled by the first cooler to the gas turbine engine;
- discharging a steam stream from a steam turbine;
- modulating, via a controller, a flow and a temperature of the second exhaust gas stream recirculated towards the gas turbine engine
- monitoring, by the controller, power consumption within at least a portion of the combined cycle power plant;
- modulating, via the controller, a flow of the steam stream discharged from the steam turbine based on the monitored power consumption;
- receiving the steam stream at a carbon capture system;
- monitoring, by the controller, power consumption of the admission compressor; and
- modulating, via the controller, a flow of the steam stream to the carbon capture system based on power consumption of the admission compressor.

17. The method in accordance with claim 16, further comprising:
- discharging a compressor discharge stream from a compressor of the gas turbine engine;
- monitoring, by the controller, a temperature of the compressor discharge stream; and
- modulating, via the controller, at least one of a flow of the cooled stream and a temperature of the cooled stream to facilitate maintaining the temperature of the compressor discharge stream within a predefined temperature range.

* * * * *